United States Patent Office 3,044,149
Patented July 17, 1962

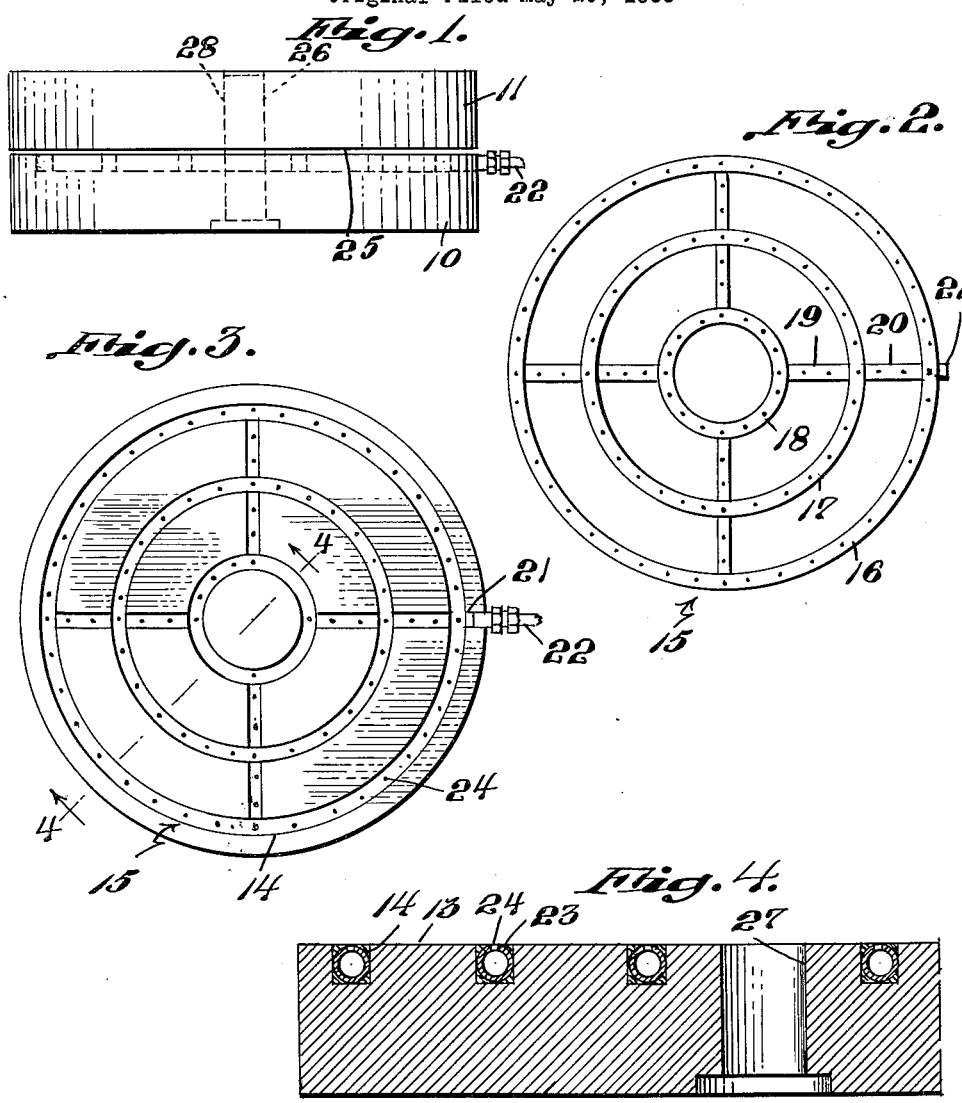

3,044,149
METHOD OF MAKING A WORK SUPPORTING STRUCTURE
John W. Conlon, Farmington, Conn., assignor to Farmington Manufacturing Company, a corporation of Connecticut
Original application May 20, 1955, Ser. No. 509,765. Divided and this application Nov. 8, 1956, Ser. No. 621,100
3 Claims. (Cl. 29—149.5)

This invention relates to the use of some fluid, which may be air or some liquid, for movably supporting a plate or carriage which has upon it some heavy structure. An illustration would be a turntable which would carry a heavy fixture for various operations by a drilling or milling machine where the work was so heavy that it would be difficult to move the same. Another illustration would be the table of a milling machine which supported some heavy work piece which was desired to be moved in a longitudinal direction from one position to another.

Frequently the work is moved on some base by sliding it along the base which may have no anti-friction means and at time work is supported upon a rotary table which is equipped with ball bearings or something of the sort for more easy movement of the table about a center.

I have found that if two ground horizontal surfaces are placed in contact, that if I can force a fluid between these surfaces, such for instance as air, and have this distributed over a substantial surface area that the upper part is lifted against gravity, carrying whatever weight may be upon it, and the parts may be easily moved either rotatively or longitudinally by a small amount of applied pressure. Accordingly, I have provided an arrangement by which a cavity is provided in one of the surfaces into which tubes are inserted and then openings are formed in the tubes in such a position that they will be in face-to-face contact with the other member so that by providing even a small amount of pressure, fluid will pass out of the multiplicity of openings and will press upon the two surfaces and distribute itself throughout the surfaces so as to provide a fluid between the surfaces enabling one to be lifted slightly and also so anti-frictioned that it may be easily relatively moved from one position to another, and while I find air preferable, as it escapes and is unnoticed in the operation, I may still use a liquid in cases where the liquid may be discharged at such locations as will not interfere with the operation of the invention.

An object of this invention is to provide an easy way of movement between two parts, one of which may support a heavy structure and yet provide a simple way by which the parts may be held by gravity and through friction against such movement.

Another object of the invention is to provide a simple way of which the tubes may be placed in one of the members to be substantially flushed therewith and to supply the fluid which I use and have found that by positioning the tubes in one of these members formed with recesses to receive the tubes of a depth substantially the diameter of the tube this may be accomplished.

With these and other objects in view, the invention consists of certain novel features of construction as will be more fully described and particularly pointed out in the appended claims.

In the accompanying drawings:

FIGURE 1 is an elevation showing a pair of rotary members, one of which is the base, and the other a carriage for the work;

FIGURE 2 is a top plan view of the tubes which are used in this invention;

FIGURE 3 is a top plan view looking at the lower base member of the device.

FIGURE 4 is an enlarged section view of line 4—4, FIGURE 3 showing the manner of locating the tubes in the base.

With reference to FIGURE 1, I provide a base member 10 and a member 11 which is referred to as a carriage member, as upon this member there may be placed heavy structures which it may be desired to move rotatively to present different sides thereof for operation thereon. One method of forming this device is to recess the base 10 in its upper surface 13 as shown by the channels 14. These channels will take shape of the tubes of a made up network of tubes designated general 15. This network of tubes comprises a circular tube 16, concentric with other circular tubes 17 and 18 which are connected together by radial tubes 19 and 20 located at four different points something after the manner of the spokes of the wheel. Some type of connection is provided at 21 for joining a supply conduit 22 thereto. The channels 14 being in the same pattern and size as the network 15 will receive this framework 15 as shown in FIGURE 3 and some securing or filling composition 23 will be positioned about the round tube so as to provide a flush surface and hold the tubes in position in the channels. Holes 24 are then provided in the top of the tubes so that when supplied by air from the conduit 22 under pressure it will lift the carriage 11 above it. These small openings will be drilled at many locations along the surface and they will consequently be distributed over the surface 25 of the carriage 11 which will cause it to be air supported so that it may easily be moved with reference to the base with whatever load it may have upon.

In showing this invention the carriage plate is provided with a central bearing 26 while the base is provided with a bore 27 to receive a pivot pin 28 to rotatively mount the carriage. That is, when the carriage is lifted by the air being directly against it, it may be easily rotated to different positions.

It will be understood that various shapes and channels for receiving these shapes may be utilized for this purpose depending upon the position of the carriage and base provided and the base may or may not be pivoted for movement, sliding movement being within the conception of the invention.

This application is a division of my application, Serial No. 509,765, filed May 20, 1955.

I claim:

1. The method of forming a plate for a fluid bearing structure comprising forming in a face of a plate a plurality of spaced channels embracing substantially the entire face of the plate, forming tubes to substantially the shape of said channels, positioning said tubes in said channels and forming fluid escape holes in said tubes in an arrangement to afford substantially uniform lift to a member covering the holes.

2. The method of forming a plate for a fluid bearing structure comprising forming in a face of a plate a plurality of spaced channels embracing substantially the entire face of the plate, forming tubes of a diameter substantially the depth of the channels to substantially the shape of said channels, positioning said tubes in said channels, filling the channels above the tubes, and forming fluid escape holes in said tubes in an arrangement to afford substantially uniform lift to a member covering the holes.

3. The method of forming a plate for a fluid bearing structure comprising forming in a plate a plurality of spaced channels embracing substantially the entire face of the plate, forming tubing in substantially the same pattern as said channels, positioning said tubing in said channels and forming fluid escape holes in said tubing in an arrangement to afford substantially uniform lift to a member covering the holes.

References Cited in the file of this patent

UNITED STATES PATENTS

| | | |
|---|---|---|
| 243,708 | Jones | July 5, 1881 |
| 1,234,878 | Corvin | July 31, 1917 |
| 1,743,438 | Defibaugh | Jan. 14, 1930 |
| 2,617,696 | Honiss | Nov. 11, 1952 |
| 2,645,534 | Becker | July 14, 1953 |
| 2,683,636 | Wilcox | July 13, 1954 |